United States Patent
Dow et al.

(10) Patent No.: US 9,602,662 B2
(45) Date of Patent: Mar. 21, 2017

(54) VERIFYING TELEPHONE CALLER ORIGIN

(71) Applicant: International Business Machines Corporation, Armonk, NY (US)

(72) Inventors: Barry N. Dow, Hampshire (GB); Peter J. Johnson, Hampshire (GB); Fenglian Xu, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/645,491

(22) Filed: Mar. 12, 2015

(65) Prior Publication Data
US 2015/0271327 A1    Sep. 24, 2015

(30) Foreign Application Priority Data
Mar. 20, 2014   (GB) .................................. 1404964.7

(51) Int. Cl.
*H04M 1/56*    (2006.01)
*H04M 15/06*   (2006.01)
(Continued)

(52) U.S. Cl.
CPC ......... *H04M 3/436* (2013.01); *H04M 3/2281* (2013.01); *H04M 3/42059* (2013.01); *H04M 3/42102* (2013.01); *H04M 2203/6027* (2013.01)

(58) Field of Classification Search
CPC .. H04M 3/42042; H04M 1/663; H04M 3/436; H04M 2203/6045;
(Continued)

(56) References Cited

U.S. PATENT DOCUMENTS 6,807,256 B1   10/2004  Holt et al.
7,027,569 B2*  4/2006   Price ..................... H04M 1/663
                                                          379/201.02
(Continued)

FOREIGN PATENT DOCUMENTS

EP          1770973 A1    4/2007
WO     2008082489 A1      7/2008
(Continued)

OTHER PUBLICATIONS

TrustID, "Simply Secure Authentication" Dec. 28, 2013; 2 pages. https://www.trustid.com/solutions/.
(Continued)

*Primary Examiner* — Binh Tieu
(74) *Attorney, Agent, or Firm* — Cantor Colburn LLP; David Woycechowsky

(57) ABSTRACT

An aspect includes verifying a telephone caller origin carried out at a security application. The verifying includes activating a security process during an active telephone call to a user received at a first call identifier, accessing registered user service providers to obtain contact details of a registered service provider purporting to be the origin of the active telephone call, and sending a query to the obtained contact details of the registered service provider. The query includes the first call identifier. The verifying also includes receiving a returned query result confirming or denying that the telephone call is from the registered service provider.

2 Claims, 4 Drawing Sheets

(51) Int. Cl.
*H04M 3/436* (2006.01)
*H04M 3/22* (2006.01)
*H04M 3/42* (2006.01)

(58) Field of Classification Search
CPC . H04M 2203/6081; H04M 2203/2038; H04W 1/12; H04W 12/12; G06Q 30/02
USPC ............ 379/142.01, 142.02, 142.04, 142.06, 379/142.17, 211.01, 211.02
See application file for complete search history.

(56) References Cited

U.S. PATENT DOCUMENTS

| | | | |
|---|---|---|---|
| 7,212,620 B1 * | 5/2007 | Mastro .................... | H04M 1/57 379/134 |
| 7,295,660 B1 * | 11/2007 | Higginbotham ...... | H04M 3/436 379/196 |
| 8,238,532 B1 * | 8/2012 | Cox ....................... | H04M 15/06 379/114.14 |
| 8,254,541 B2 * | 8/2012 | Cai .................... | H04M 3/42059 370/352 |
| 8,467,512 B2 | 6/2013 | Amir et al. | |
| 8,503,645 B1 | 8/2013 | Oliver | |
| 8,831,192 B1 * | 9/2014 | Clarke .............. | H04M 3/42042 379/142.06 |
| 8,948,360 B2 * | 2/2015 | Lund .................... | H04M 1/247 379/142.01 |
| 9,264,536 B1 * | 2/2016 | Saitawdekar ..... | H04M 3/42059 |
| 2007/0165811 A1 | 7/2007 | Reumann et al. | |
| 2009/0136013 A1 * | 5/2009 | Kuykendall .......... | H04M 1/575 379/142.17 |
| 2009/0168755 A1 * | 7/2009 | Peng .................... | H04L 63/0407 370/352 |
| 2009/0190737 A1 | 7/2009 | Dunmire et al. | |
| 2010/0020953 A1 * | 1/2010 | Lidstrom .............. | H04M 1/663 379/142.04 |
| 2011/0026699 A1 | 2/2011 | Amir et al. | |
| 2011/0211682 A1 | 9/2011 | Singh et al. | |
| 2012/0294435 A1 * | 11/2012 | Cox ....................... | H04M 15/06 379/201.02 |
| 2013/0195257 A1 * | 8/2013 | Wood .................. | H04M 3/4365 379/67.1 |
| 2015/0229631 A1 * | 8/2015 | Pillay .................... | G06Q 10/10 726/4 |

FOREIGN PATENT DOCUMENTS

| | | |
|---|---|---|
| WO | 2009010944 A2 | 1/2009 |
| WO | 2012154730 A1 | 11/2012 |

OTHER PUBLICATIONS

UK Search Report Under Section 17(5) for Application No. GB1404964.7 mailed Aug. 26, 2014; 4 pages.

IBM, "Approach for Detecting and Screening Fake-Caller-Number Calls Happened in Mobile Networks," IP.com, IP.com No. 000191165; Publication Date: Dec. 21, 2009; 3 pages.

IBM, "Caller/Called Authentication in a Phone Call,"IP.com, IP.com No. 000135058; Publication Date: Mar. 28, 2006; 9 pages.

* cited by examiner

VERIFYING TELEPHONE CALLER ORIGIN

BACKGROUND

There are many passive security checks applied to individuals via landline telephone or mobile phone calls. For example, calls may be received from a bank or insurance company. At the start of a call, the caller generally asks for some personal sensitive information (PSI) to verify to whom they are speaking.

However, such calls may not be genuine and may be malicious calls by people phishing for information. The more information an individual provides, the more chance this information will be hijacked and become less secure.

The ability to verify by an individual that the caller is actually calling from a trusted party can be challenging. Current methods of asking for a reference or confirmation from the caller may not always be reliable.

SUMMARY

According to one embodiment, there is provided a method for verifying a telephone caller origin carried out at a security application. The method includes activating a security process during an active telephone call to a user received at a first call identifier, accessing registered user service providers to obtain contact details of a registered service provider purporting to be the origin of the active telephone call, and sending a query to the obtained contact details of the registered service provider. The query includes the first call identifier. The method also includes receiving a returned query result confirming or denying that the telephone call is from the registered service provider.

According to another embodiment, there is provided a method for verifying a telephone caller origin carried out at a service provider server. The method includes receiving a query at a service provider requesting verification that an active call is a genuine call from or on behalf of the service provider. The query includes a first call identifier of the number at which the call was received. The method also includes checking active call logs to ascertain if there is a current call to the first call identifier from or on behalf of the service provider, and returning a query result confirming or denying that the telephone call is from the registered service provider.

According to a further embodiment, there is provided a system for verifying a telephone caller origin activated from a telephone device at which an active telephone call is received and the telephone device having a first call identifier. The system includes a security application capable of being activated by an input in the telephone device of a user during the active telephone call. The security application includes a look up component for accessing registered user service providers to obtain contact details of a registered service provider purporting to be the origin of the active telephone call, and a query component for sending a query to the obtained contact details of the registered service provider. The query includes the first call identifier at which the active telephone call has been received. The security application also includes a response component for receiving a returned query result confirming or denying that the telephone call is from the registered service provider.

According yet another embodiment, there is provided a computer program product for verifying a telephone caller origin carried out at a security application. The computer program product includes a computer-readable storage medium having computer-readable program code embodied therewith. The computer-readable program code is configured to activate a security process during an active telephone call to a user received at a first call identifier, access registered user service providers to obtain contact details of a registered service provider purporting to be the origin of the active telephone call, and send a query to the obtained contact details of the registered service provider. The query includes the first call identifier. The computer-readable program code is also configured to receive a returned query result confirming or denying that the telephone call is from the registered service provider.

According to a further embodiment, there is provided a computer program product for verifying a telephone caller origin carried out at a service provider server. The computer program product includes a computer-readable storage medium having computer-readable program code embodied therewith. The computer-readable program code is configured to receive a query at a service provider requesting verification that an active call is a genuine call from or on behalf of the service provider. The query includes a first call identifier of the number at which the call was received. The computer-readable program code is also configured to check active call logs to ascertain if there is a current call to the first call identifier from or on behalf of the service provider, and return a query result confirming or denying that the telephone call is from the registered service provider.

The described aspects of the invention provide the advantage of verifying if a call is being received from or on behalf of a trusted party in order to prevent individuals from becoming victims of identity theft.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments described herein provide for verifying the origin of a call received by a user while the user is on the call.

Figure 1:
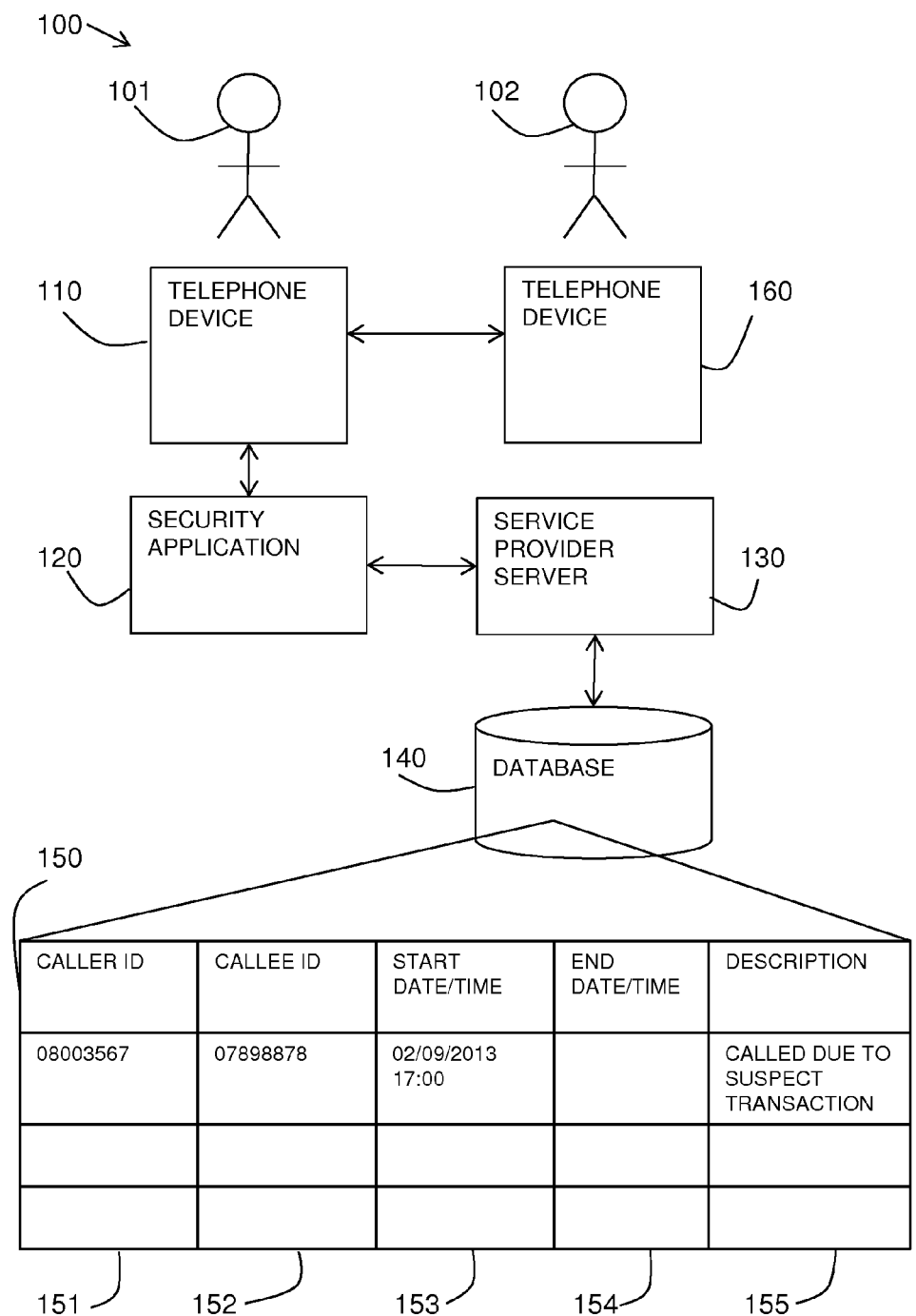
FIG. 1 is a schematic diagram of a system in accordance with an embodiment.

Referring to FIG. 1, a schematic diagram shows an example embodiment of the described system 100. A user 101 (or callee) is an individual receiving a telephone call on a telephone device 110 from a caller 102 using a second telephone device 160. The telephone device 160 may be a mobile phone or a landline phone or any other device capable of receiving telephone calls including voice over Internet calls.

The user's telephone device 110 may include a security application 120 which provides the functionality to contact a service provider server 130 whilst the call is active. The service provider server 130 may have access to a database 140 of call logs 150 of the service provider and other trusted third parties who may make calls on behalf of the service provider. The logs 150 may include, for example, a caller identifier 151, a callee identifier 152, a start date/time of a call 153, an end date/time of a call 154, and a description of a call purpose 155.

Figure 2:
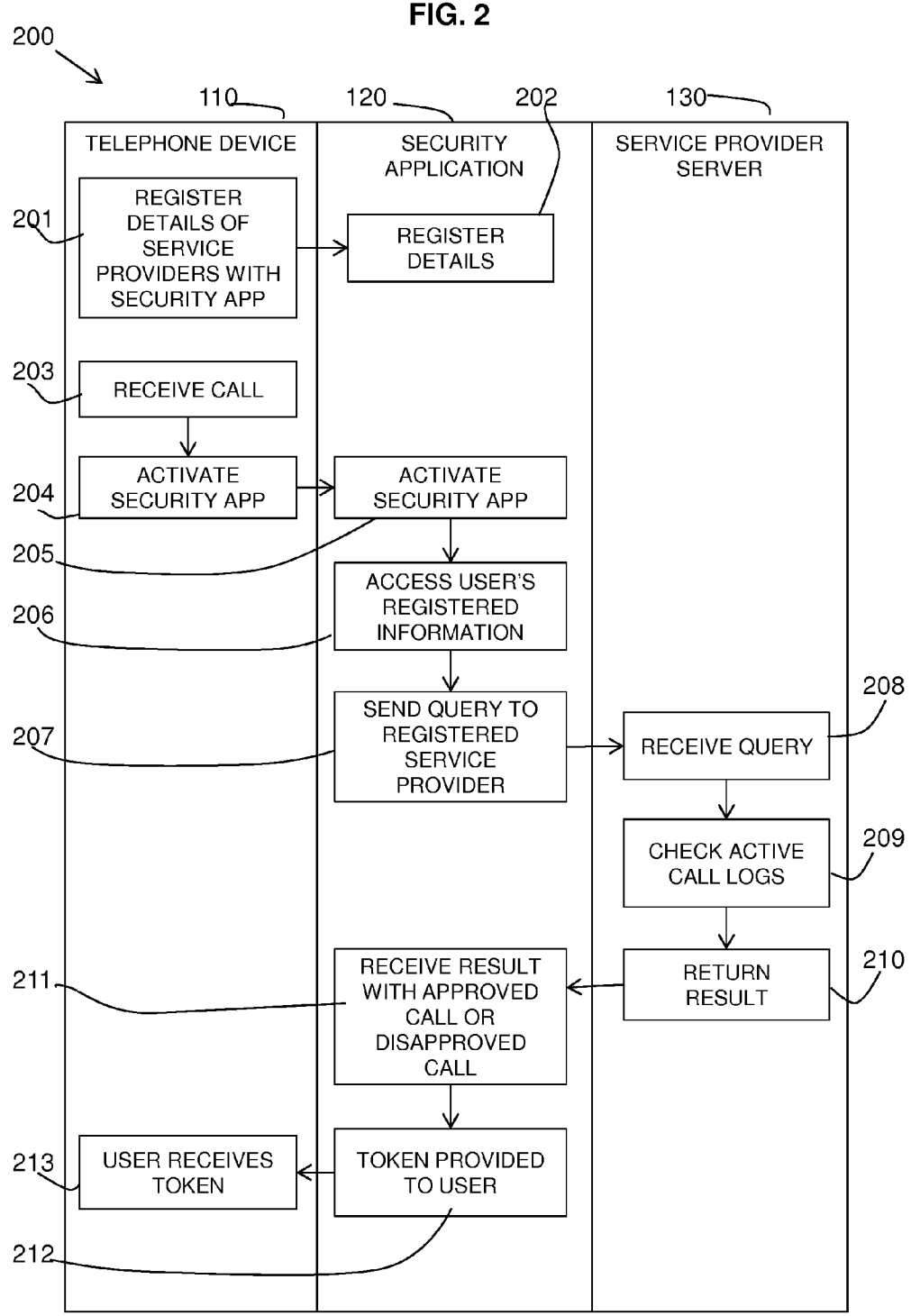
FIG. 2 is a swim-lane flow diagram of a method in accordance with an embodiment.

Referring to FIG. 2, a swim-lane flow diagram 200 shows an embodiment of the described method as carried out by a user at his telephone device 110, by a security application 120 on or accessed by the telephone device 110, and by a service provider server 130.

As a preliminary stage, a user may register 201, 202 details of his service providers and the service providers' legitimate contact details, for example, in the form of telephone numbers, email, or other details, with the security application 120.

The user may also have registered his details with the service provider including phone/mobile phone numbers, email and other personal sensitive data such as date of birth, etc. A trusted caller may also be registered and have reference data at the service provider.

When a user (the callee) receives 203 a call at his telephone device 110 purporting to be from a service provider such as a bank or insurance company, the user may activate 204 a security process, for example, by activating the security application 120 using his telephone device. The user may ask "Who is calling please" and put them on hold asking them to wait.

The activation 203 of the security application may be carried out in various ways. In one example, the user may press a pre-defined key (for example, *6) or may type a word to activate the security application. This may automatically mute the phone and may provide a voice message to the caller that a check is being carried out. In another example, the user may physically mute his phone and then activate the security application. In another example, the security application may be activated by a voice command, such as: "Verify this call" or "Verify this call is from X Bank".

After activation 205 at the security application 120, the security application 120 may access 206 the user's personal registered information including a list of registered service providers. Optionally, a list of registered service providers may be displayed to the user for selection of the service provider the call purports to be from. Alternatively, the name of a service provider may be provided by the user.

The security application 120 may send 207 a query to a registered number or other registered contact details (for example, email) of the service provider, the query may include the telephone number of the callee on which the call has been received. The query may also include the telephone number from which the caller is calling which may be obtained from the caller information of the user's telephone device. The query may be in the form of a message or other communication.

The service provider server may receive 208 the query and may check 209 if there is an active call from a call center or other of the service providers registered third parties calling the user at the provided number at that moment. This may involve looking up a database of call logs of the service provider and other registered third parties. The database look up may use the caller's name, caller's phone number, caller's call center, start time, and purpose etc.

The service provider server may return 210 a result in the form of a verification message to the user. The verification message may verify if this person is calling from or on behalf of a trusted party at that moment or not.

A result may be received 211 by the security application in the form of a verification message approving the call. This indicates that the caller is someone calling from a registered service provider. A token may be provided 212 to the user to indicate whether or not they may continue with the call. The telephone device 110 may receive a token 213 from the security application.

The user may then un-mute the call, or this may be automatically carried out by the security application or the telephone device, and the user may start his conversation with this person. The token may be a voice, an image or message to show whether or not this caller is from the X bank. For example, a smile image or a sad image to represent a positive or negative verification.

The received result 211 may be a message disapproving the call. If the message does not confirm the call, the token 212, 213 may be in the form of an alert sent to the user and the user may stop talking to the caller or the call may be automatically terminated.

The described mechanism enables users to actively verify that their callers are from a trusted party before providing their personal sensitive data to someone over a phone call. This can prevent users from sharing sensitive data to an untrusted party and therefore reduces the risk of losing their money.

Figure 3:
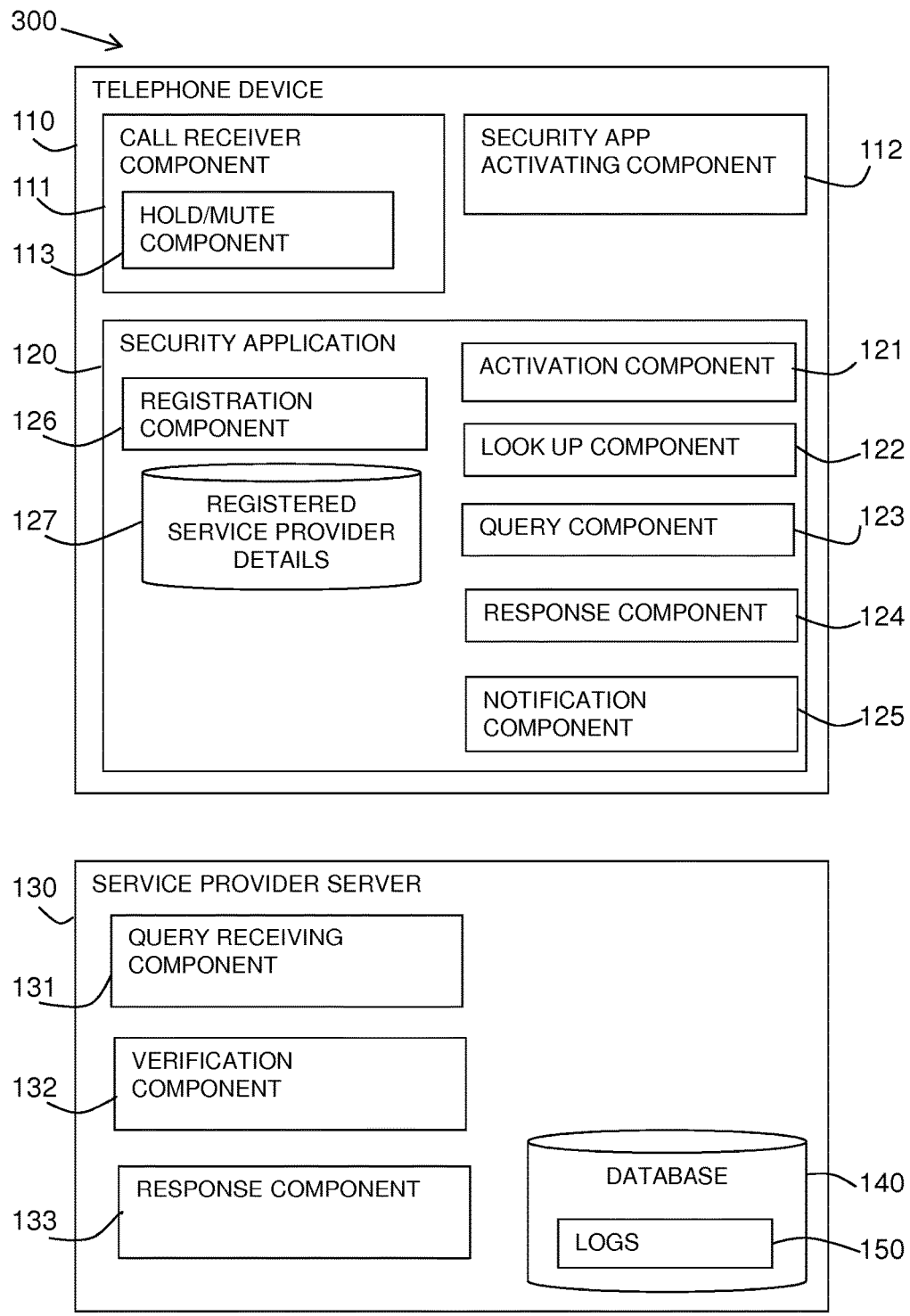
FIG. 3 is a block diagram a system in accordance with an embodiment.

Referring to FIG. 3, a block diagram 300 shows the components of a telephone device 110 with a security application 120 and a service provider server 130 having access to a database 140.

A telephone device 110 may be in the form of a smart mobile phone having and installed security application 120 as shown in FIG. 3. Alternatively, the telephone device 110 may remotely communicate with a security application 120, for example, hosted on a separate computer device from the telephone device 110.

The telephone device 110 may include a call receiver component 111 and a security application activating component 112. The call receiver component 111 may include a hold or mute component 113 for placing a caller on hold whilst the security application 120 is in operation.

The security application 120 may include a registration component 126 for registering and storing 127 contact details of valid service providers.

The security application 120 may include an activation component 121 to activate the security application 120 in response to a prompt or demand from a user on a call. The activation component 121 may access the caller identifier number from the telephone device 110.

The security application 120 may include a look up component 122 to look up registered information of the user's service providers to obtain contact information in order to send a message to a service provider who has purported to have called the user. The look up component 122 may provide a list of service providers to the user for the user to select the one which has purported to have called. Alternatively, the look up component 122 may look up a service provider based on a name given.

The security application 120 may include a query component 123 for generating a message to a service provider including the user's phone number and optionally other information such as the number the received call originated from.

The security application 120 may include a response component 124 for receiving a response message from a service provider confirming or denying that the call is genuine.

The security application 120 may include a notification component 125 for notifying the telephone device 110 of the user of the outcome of the security application's check. The notification component 125 may include sending an alert to the user or automatically disconnecting the call on the telephone device 110 if the call is not genuine.

A service provider server 130 may have an associated database 140 in which logs 150 of calls are stored including calls from trusted third parties. The logs 150 may include details of the caller identifier, callee identifier, date/time of call, purpose, etc.

The service provider server 130 may include a query receiving component 131 and a verification component 132 for checking the logs 150 to verify if a queried call is recorded in the logs 150. A response component 133 may provide a notification message back to the security application 120 confirming or denying the call.

Figure 4:
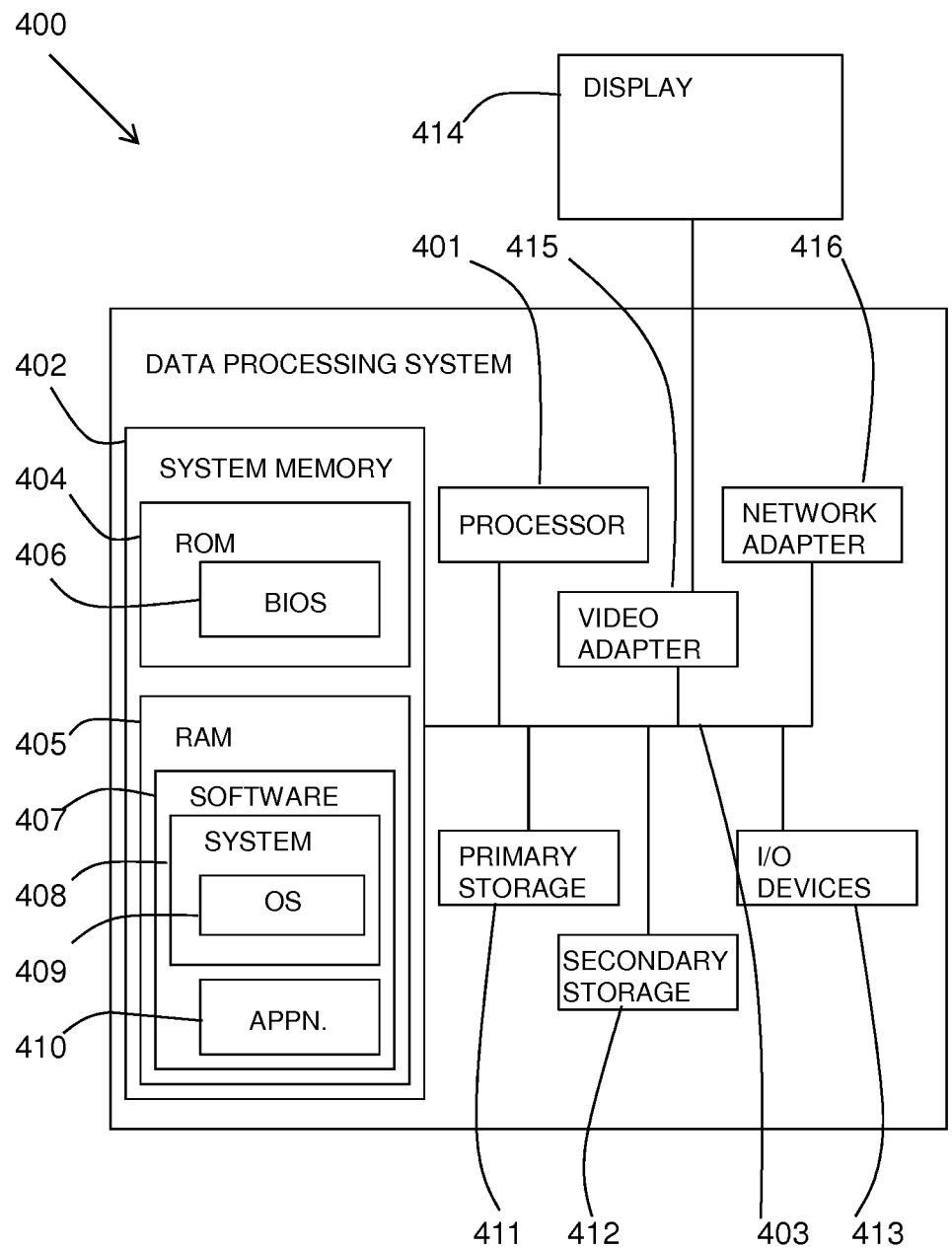
FIG. 4 is a block diagram of a computer system in accordance with an embodiment.

Referring to FIG. 4, an exemplary system for verifying telephone caller origin includes a data processing system 400 suitable for storing and/or executing program code including at least one processor 401 coupled directly or indirectly to memory elements through a system bus 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

The invention claimed is:

1. A method for verifying a telephone caller origin carried out at a security application, comprising:
  receiving, by a first telephone device of a first user entity from a second telephone device of a second user entity, a first telephone call;
  subsequent to receipt of the first telephone call, receiving, by the first telephone device and from the first user entity, first user input indicative of a desire to mute the first telephone device with respect to the first telephone call;
  responsive to the receipt of the user input, muting, by the first telephone device, the first telephone device with respect to the first telephone call while maintaining as active the first telephone call;
  subsequent to the muting, receiving, by the first telephone device and from the first user entity, second user input indicative of a request to activate a security process, with the second user input being a verbal statement spoken out loud by the first user into the first telephone device, which verbal statement is indicative of a purported entity that is purportedly making the first telephone call;
  in response to receipt of the second user input, activating the security process during the active telephone call received at a device associated with a first call identifier, with the security process including:
    fetching, by an application running on the first telephone device, personal registered information associated with a telephone number of the first user, and sending, by the first telephone device, a query including the personal registered information to a third telephone device belonging to the purported entity;
  receiving, by the first telephone device and from the third telephone device, a returned query result confirming that the telephone call is from the purported entity; and
  responsive to receiving the returned query result, unmuting the first telephone device with respect to the first telephone call so that the first telephone call can interactively continue.

2. The method as claimed in claim 1, wherein receiving a returned query result includes receiving or generating a token providing details of the result in the form of one or more of the group of: a message, a voice, a sound, an image, an automatic un-muting of the active call, and an automatic disconnection of the active call.

* * * * *